United States Patent [19]

Harrigan et al.

[11] Patent Number: 4,783,157
[45] Date of Patent: Nov. 8, 1988

[54] SYMMETRICAL WIDE ANGLE LENS WITH IMPROVED ILLUMINATION UNIFORMITY

[75] Inventors: Michael E. Harrigan, Webster; Edward A. Powers, Penfield, both of N.Y.

[73] Assignee: Xerox Corporation, Stamford, Conn.

[21] Appl. No.: 44,272

[22] Filed: Apr. 30, 1987

[51] Int. Cl.$^4$ ................................. G02B 9/64
[52] U.S. Cl. ................................. 350/463
[58] Field of Search ................................. 350/425, 463

[56] References Cited

U.S. PATENT DOCUMENTS

| 2,516,724 | 7/1950 | Roossinov | 88/57 |
| 2,730,016 | 1/1956 | Bertele | 88/57 |
| 2,821,113 | 1/1958 | Baker | 350/463 |
| 3,154,628 | 10/1964 | Bertele | 88/57 |
| 3,777,135 | 12/1973 | Rees | 240/41.35 R |
| 3,973,831 | 8/1976 | Minoura | 350/463 X |
| 4,037,937 | 7/1977 | Minoura | 350/425 |
| 4,298,274 | 11/1981 | Rees et al. | 355/71 |
| 4,331,391 | 5/1982 | Baker | 350/463 |
| 4,537,499 | 8/1985 | Ritter et al. | 355/58 |

OTHER PUBLICATIONS

Technical Information, by Schneider, G-Claron Wa(6 pp.).

Primary Examiner—John K. Corbin
Assistant Examiner—Scott J. Sugarman

[57] ABSTRACT

A ten-element wide angle lens is optimized for projecting full frame images of a document at an object plane onto a photosensitive image plane. The lens has a semi-field angle greater than 38°, a relative aperture of f/10, and a magnification range of 0.65 to 1.55. The lens is characterized by improved relative illumination, improved pupil coma, and partial $\cos^4$ illumination falloff compensation.

3 Claims, 6 Drawing Sheets

SYMMETRICAL WIDE ANGLE LENS WITH IMPROVED ILLUMINATION UNIFORMITY

BACKGROUND AND MATERIAL INFORMATION DISCLOSURE

The present invention relates to a wide symmetrical lens and, more particularly, to a symmetrical, ten element lens particularly suited for use in a photocopier optical system with document semi-field viewing angles greater than 40°.

In electrophotographic copiers, the areas of a charged photoconductive surface, which are irradiated by a light image, are discharged, the degree of discharge dependent upon the intensity of the impinging light rays. It is therefore desirable that the light intensity vary only due to the reflectance characteristics of the original document being copied rather than due to changes introduced by the imaging components. Stated in another manner, the optimum system would be one that provides uniform photoconductor irradiance given a uniformly reflecting document.

Of the factors affecting relative illumination at an imaging plane, the most significant is the cosine (cos) variation wherein the irradiance at an image plane is approximately proportional to the $\cos^4$ of the field angle. Thus, even if an object plane is uniformly illuminated, photoconductor irradiance decreases as radial distance from the system optical axis increases. Various approaches have been devised to compensate for this effect. Typically, in systems where a document is incrementally illuminated and scanned by a lamp/mirror assembly, a sheet of opaque material having a butterfly-shaped slit formed therein is used to increase the amount of illumination at the edges of the image.

In full frame imaging systems wherein an entire document is illuminated by flash illumination, efforts to compensate for $\cos^4$ light falloff have emphasized location the flash lamps in such a way that the document edges are illuminated to a greater degree than the central areas. Such a system is disclosed in U.S. Pat. No. 3,777,135. If the full frame flash system provides a magnification (generally reduction) option, a variation of the field angles introduces further $\cos^4$ variations with magnification changes and it has proved difficult to maintain the desired image plane uniformity through all the different magnification positions with this lamp arrangement compensation method.

Another method of $\cos^4$ compensation is to smooth the exposure by reducing center illumination by means of a relative illumination filter. Such a filter design for a full frame flash copier is disclosed in U.S. Pat. No. 4,298,274. This solution has the disadvantages of requiring additional components (the filter) in the imaging system and also of requiring additional illumination power to compensate for the light transmission loss through the denser areas of the filter.

The $\cos^4$ illumination falloff is an approximation which neglects the effects of pupil aberration. Coma of the pupil which is introduced by the optics between the object and aperture stop, can cause the pupil to increase or decrease in size for off-axis object points. A decrease in pupil size means that the aperture stop itself vignettes the off-axis light bundle and reduces the irradiance more than the $\cos^4$ falloff. An increase in pupil size will allow more light to pass through the lens off-axis if the outer elements are large enough to pass the increased bundle.

A lens such as the Topogon form disclosed in U.S. Pat. No. 2,031,792 has pupil coma which reduces the off-axis pupil size in such a way as to cause approximate $\cos^5$ fall off. This effect is shown graphically in the Schneider publication "Technical Information G-Claron WA."

It would be preferable to compensate, in a wide angle system, for the $\cos^4$ effects without the use of additional components such as additional flash lamps or relative illumination filters and without requiring increases in system illumination or, conversely, with no decrease in illumination efficiency. Such compensation has been suggested by various lens designs used for the purpose of aerial photography, as disclosed in U.S. Pat. Nos. 2,516,724; 2,730,016; 3,154,628; 2,821,113; and 4,331,391. The latter two patents disclose non-symmetrical designs requiring aspheric surfaces; characteristics which are not suitable to flat document copying requirements. Further, none of the references discloses a wide angle lens which provides compensation through a magnification range.

The present invention is directed to a novel wide angle lens whose design partially compensates for $\cos^4$ illumination light fall off, thus requiring less electrical energy consumption. More specifically, the invention relates to a wide angle photocopy lens system having a semi-field angle greater than 38°, a relative aperture of F/10, said lens system being partially compensated for $\cos^4$ relative illumination fall off through a magnification range of 0.64 to 1.55.

IN THE DRAWINGS

DESCRIPTION

Figure 1:
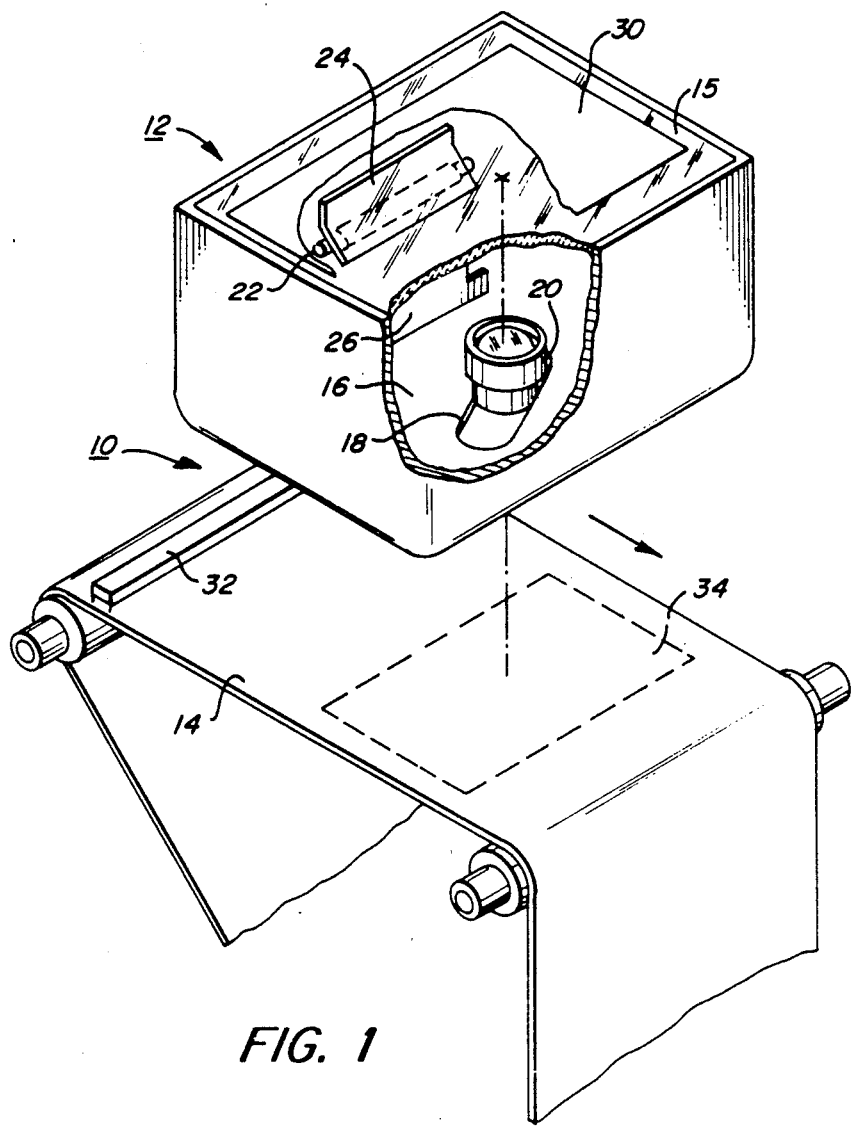
FIG. 1 is a schematic perspective top view of a full frame flash illumination document imaging system incorporating the preferred embodiment of the wide angle lens of the present invention.

Referring to the drawings, FIG. 1 shows a document imaging system 10 which includes an integrating optical cavity 12 and a photoreceptor belt 14 (only a portion of which is shown). Cavity 12 is a completely enclosed housing, generally rectangular in shape. An upper, or top wall, is defined by a glass document support platen 15. The lower, or bottom wall, 16 has an aperture 18 therein which accommodates a 10-element wide angle lens 20 designed according to the principles of the present invention.

Mounted in one wall of cavity 12 is flash lamp 22 which may be for example, a Xenon gas lamp. The lamp is connected to pulsing circuitry, not shown, which, when activated, pulses the lamp resulting in an illumination flash of appropriate output and duration. The interior walls of the cavity have substantially diffusely reflecting surfaces which cause the flashed light to undergo multiple reflections from the walls, providing a uniform level of illumination at the document 30 on the top of platen 15. Blockers 24 and 26 prevent direct light from reaching the platen and lens respectively. Lens 20 is movable through various magnification positions by an enabling mechanism which, for example, can be accomplished using the mechanism disclosed in U.S. Pat No. 4,537,499 whose contents are hereby incorporated by reference.

In operation, an original document 30 to be copied is placed on platen 15. When lamp 22 flashes, the document is uniformly illuminated by the light diffusely reflected from the cavity walls. The light rays are reflected from the original document and are projected as a light image of the original document through lens 20 onto photoreceptor belt 14. The surface of belt 14 has been charged, at a point prior to the exposure station, by a corona generating device 32. As the light image of the document strikes the surface, background areas are discharged to form an electrostatic latent image 34 conforming to the original document. In the absence of any lens compensation, the exposure level towards the edges of image 34 tend to fall off to about 1/3 the level of the exposure at the center. Lens 20 has been designed, however, to significantly increase the edge exposure without reducing the overall exposure level (as is the case with the relative illumination filter solution) or by decreasing illumination efficiency.

Figure 2:
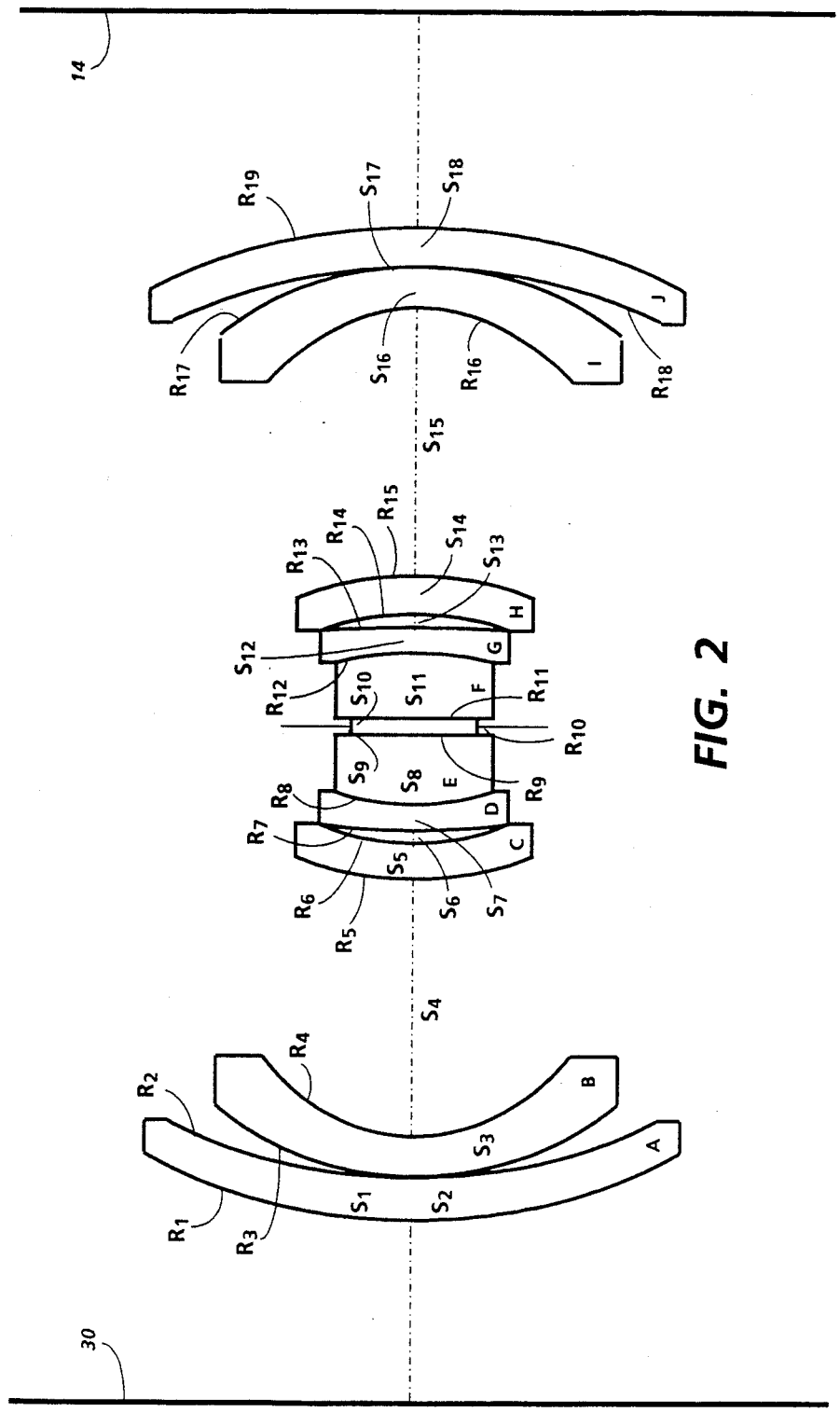
FIG. 2 is a schematic cross-sectional view of the wide angle lens shown in FIG. 1.

Turning now to FIG. 2 there is shown a schematic cross-sectional view of the wide angle lens of the present invention.

Surface data for three embodiments of this invention are given in attached tables, A, B and C, the preferred embodiment incorporating the Table A design. A lens designed according to Tables B or C data will be longer and shorter length. The preferred embodiment has a length of 137.07 mm, embodiment 2 has a length of 147.65 mm and embodiment 3 a length of 124.00 mm. These designs have the property that the shorter lenses have less compensation for $\cos^4$ fall off and an increased amount of both sagittal field curvature is partially balanced by the spherical aberration, but the full field modulation decreases as the two aberrations both increase since the balance is not perfect.

If we express the relative illumination increase $I_r$ of the full field beam relative to that of the axial beam I by a factor, called f, then the irradiance at full field is approximately given by:

$$I_r = f \cdot I \cos^4 A \tag{1}$$

A is the semi-field angle. If the number of each example lens is used as a subscript of f, the following values are obtained:

$$f_A = 1.31; f_B = 1.28; f_C = 1.31 \tag{2}$$

With a semi-field angle of 40.4° at 1x, it can be seen that a value of f equal to 1.31 compensates for one cosine factor. Each lens has a total conjugate of 660.3 mm at 1x.

Referring to FIG. 2 and Table A, the lens is designed for operation over a 40.2° semi-field angle and over a magnification range of 0.65 to 1.55X. The lens is distinguished by improved relative illumination; $\cos^4$ compensation and low distortion. The lens has 10 elements arranged symmetrically in five-element groups on both sides of a center stop. Elements A and J are the outermost positive elements curved toward the aperture. Elements B and I are strong negative meniscus lenses also curved towards the aperture. Elements C and H are positive meniscus elements of high refractive index positioned around the stop. Elements D and E comprise a cemented doublet whose symmetrical pair is elements F and G.

TABLE A

| SURFACE | RADIUS | SPACING | REFRACTIVE INDEX $n_d$ | ABBE V NUMBER |
|---|---|---|---|---|
| 1 | 100.774602 | 6.582286 | 1.67270 | 32.17 |
| 2 | 125.402157 | .100000 | 1.00000 | |
| 3 | 62.082748 | 5.000000 | 1.60311 | 60.69 |
| 4 | 33.350284 | 30.068850 | 1.00000 | |
| 5 | 52.117483 | 6.975000 | 1.83400 | 37.34 |
| 6 | 88.610023 | 1.077705 | 1.00000 | |
| 7 | 254.540522 | 3.035434 | 1.67270 | 32.17 |
| 8 | 46.407658 | 14.696875 | 1.60729 | 59.47 |
| 9 | .000000 | 2.000000 | 1.00000 | |
| 10 | .000000 | 14.696875 | 1.60729 | 59.47 |
| 11 | −46.407658 | 3.035434 | 1.67270 | 32.17 |
| 12 | −254.540522 | 1.077705 | 1.00000 | |
| 13 | −88.610023 | 6.975000 | 1.83400 | 37.34 |
| 14 | −52.117483 | 30.068850 | 1.00000 | |
| 15 | −33.350284 | 5.000000 | 1.60311 | 60.69 |
| 16 | −62.082748 | .100000 | 1.00000 | |
| 17 | −125.402157 | 6.582286 | 1.67270 | 32.17 |
| 18 | −100.774602 | .000000 | 1.00000 | |

TABLE B

| SURFACE | RADIUS | SPACING | REFRACTIVE INDEX $n_d$ | ABBE V NUMBER |
|---|---|---|---|---|
| 1 | 67.436112 | 6.582286 | 1.67270 | 32.17 |
| 2 | 80.307693 | .100000 | 1.00000 | |
| 3 | 68.981330 | 2.400000 | 1.60311 | 60.69 |
| 4 | 35.845191 | 38.233828 | 1.00000 | |
| 5 | 62.091592 | 6.975000 | 1.83400 | 37.34 |
| 6 | 128.830680 | .803556 | 1.00000 | |
| 7 | 447.534231 | 3.035434 | 1.67270 | 32.17 |
| 8 | 50.443979 | 14.696875 | 1.60729 | 59.47 |
| 9 | .000000 | 2.000000 | 1.00000 | |
| 10 | .000000 | 14.696875 | 1.60729 | 59.47 |
| 11 | −50.443979 | 3.035434 | 1.67270 | 32.17 |
| 12 | −447.534231 | .803556 | 1.00000 | |
| 13 | −128.830680 | 6.975000 | 1.83400 | 37.34 |
| 14 | −62.091592 | 38.233828 | 1.00000 | |
| 15 | −35.845191 | 2.400000 | 1.60311 | 60.69 |
| 16 | −68.981330 | .100000 | 1.00000 | |
| 17 | −80.307693 | 6.582286 | 1.67270 | 32.17 |
| 18 | −67.436112 | .000000 | 1.00000 | |

TABLE C

| SURFACE | RADIUS | SPACING | REFRACTIVE INDEX $n_d$ | ABBE V NUMBER |
|---|---|---|---|---|
| 1 | 89.640958 | 6.582286 | 1.67270 | 32.17 |
| 2 | 111.178381 | .100000 | 1.00000 | |
| 3 | 60.075936 | 2.400000 | 1.60311 | 60.69 |
| 4 | 31.913736 | 25.960165 | 1.00000 | |
| 5 | 47.799041 | 6.975000 | 1.83400 | 37.34 |
| 6 | 78.903395 | 1.248697 | 1.00000 | |
| 7 | 239.375238 | 3.035434 | 1.67270 | 32.17 |
| 8 | 44.508344 | 14.696875 | 1.60729 | 59.47 |
| 9 | .000000 | 2.000000 | 1.00000 | |
| 10 | .000000 | 14.696875 | 1.60729 | 59.47 |
| 11 | −44.508344 | 3.035434 | 1.67270 | 32.17 |
| 12 | −239.375238 | 1.248697 | 1.00000 | |
| 13 | −78.903395 | 6.975000 | 1.83400 | 37.34 |
| 14 | −47.799041 | 25.960165 | 1.00000 | |
| 15 | −31.913736 | 2.400000 | 1.60311 | 60.69 |
| 16 | −60.075936 | .100000 | 1.00000 | |
| 17 | −111.178381 | 6.582286 | 1.67270 | 32.17 |
| 18 | −89.640958 | .000000 | 1.00000 | |

The lens of Table A has a length of 137.07 mm and a total conjugate, object to image distance, of 660.3 mm at a magnification of 1x. Most of the pupil coma is contributed by elements B and I, the strong negative menisci.

Figure 3:
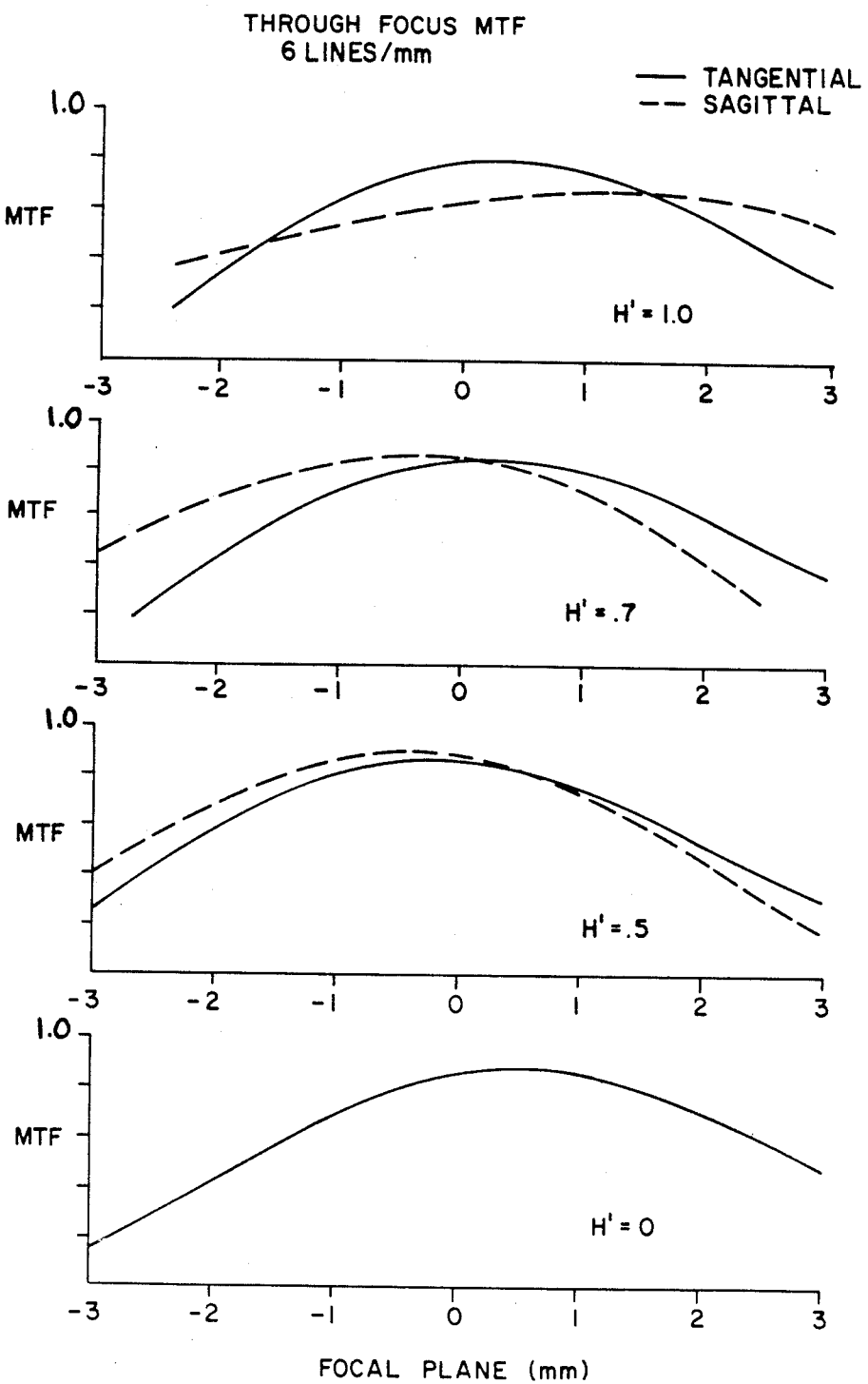
FIG. 3 shows modulation transfer function (MTF) curves through focus for the preferred embodiment of the lens.

FIG. 3 shows modulation transfer function curves for the preferred lens embodiment (Table A) through focus at various values of relative field position. The abscissa is the focal plane shift in millimeters; the ordinate is the modulation which is unitless. The dotted lines represent the modulation transfer function for radial lines (S) and the solid lines represent the modulation transfer for tangential lines (T).

The labels H' refer to relative field coordinates for the magnification of 1x. These curves show the correction of astigmatism and field curvature and give the depth of focus for a specified modulation level at 6 lines/mm.

Figure 4:
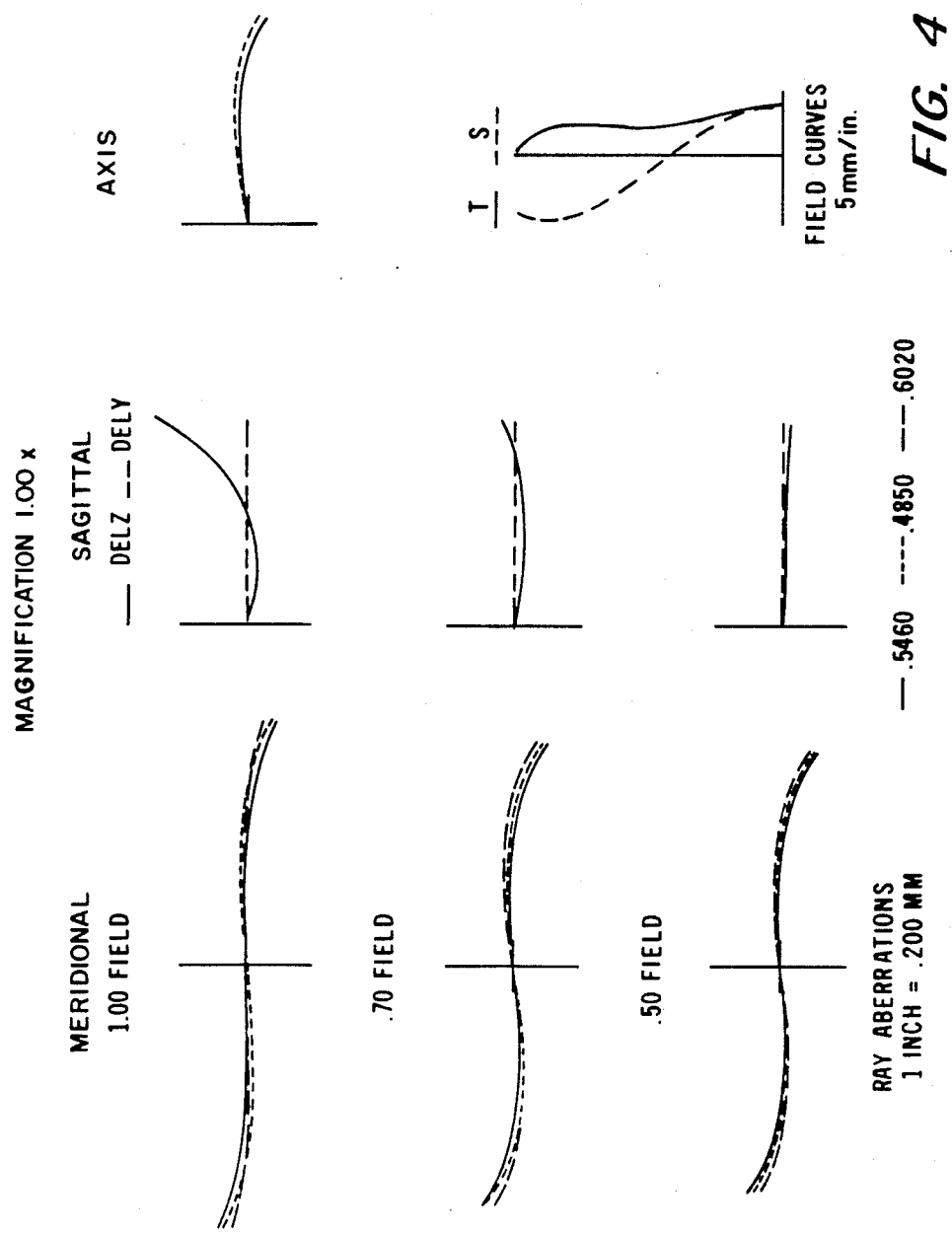
FIG. 4 is a ray aberration plot summary of the preferred embodiment for a magnification of 1x.

FIG. 4 shows the ray aberration curves for four field points and three wavelengths. Also shown in the lower right corner is the astimigmatic field curves. Since this is for 1x and a symmetrical lens, neither the % distortion or lateral color are shown since they are zero.

For the Meridional and Sagittal curves, the abscissa is relative aperture measured in terms of relative tangents of the exit angle. A comparison of the abscissa width of the "AXIS" plot with the 1.00 field shows that the full field has an increased width, meaning that a larger numerical aperture is being accepted in the Meridional section of the bundle. This is one measure of the pupil coma which increased the off-axis numerical aperture.

The abscissa of the "FIELD CURVES" plot is the actual field curvature measured from a focal plane shifted from paraxial focus shown where the curves come together for zero ordinate value which is the relative field coordinate. The total range of the abscissa is 5 mm.

Figure 5:
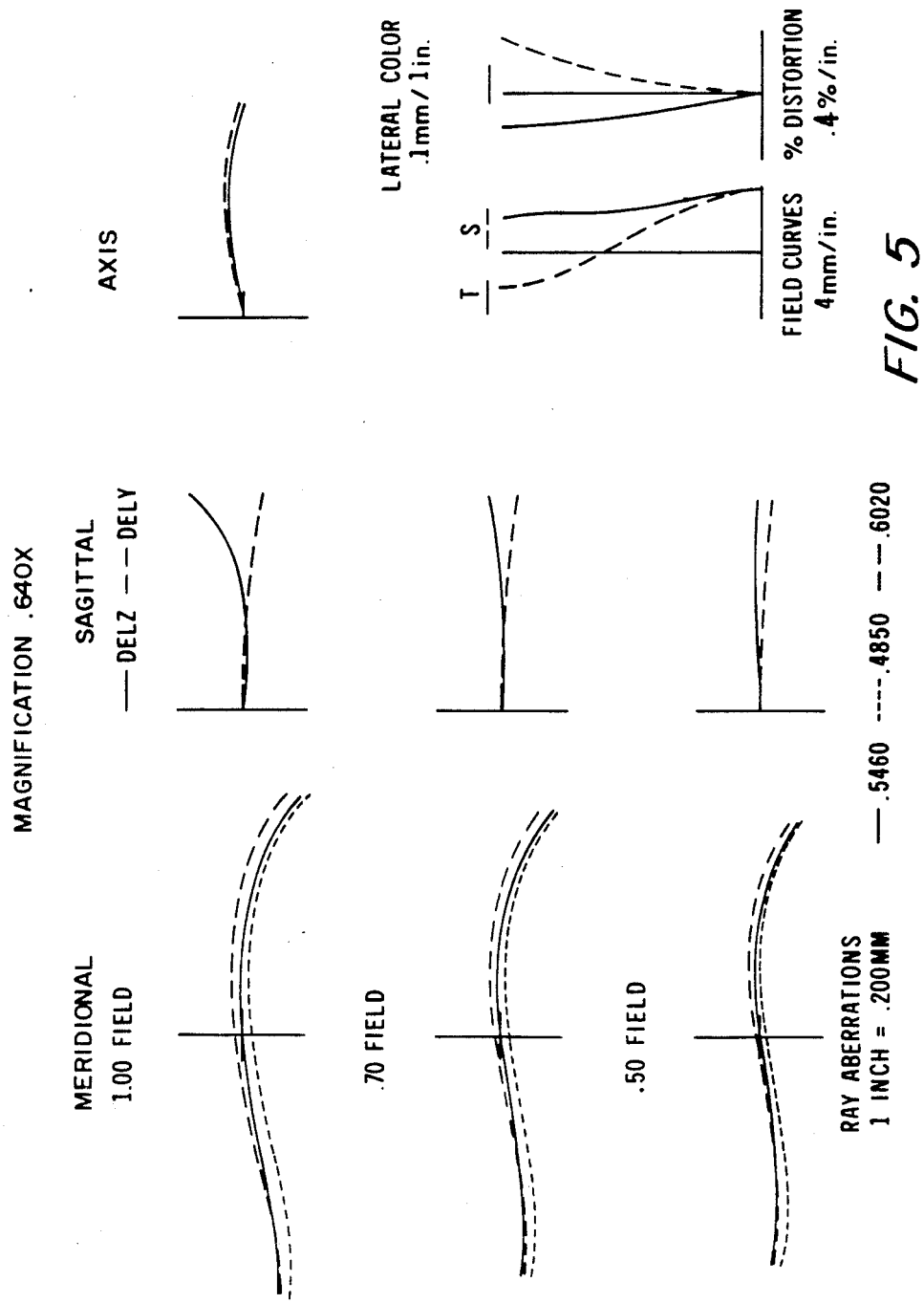
FIG. 5 is a ray aberration plot summary of the preferred embodiment for a magnification of 0.64x.

FIG. 5 is an aberration plot for the example 1 lens for a magnification of 0.64x which includes % distortion and lateral color neither of which are identically zero. These also show an increase in off-axis numerical aperture caused by pupil coma.

Figure 6:
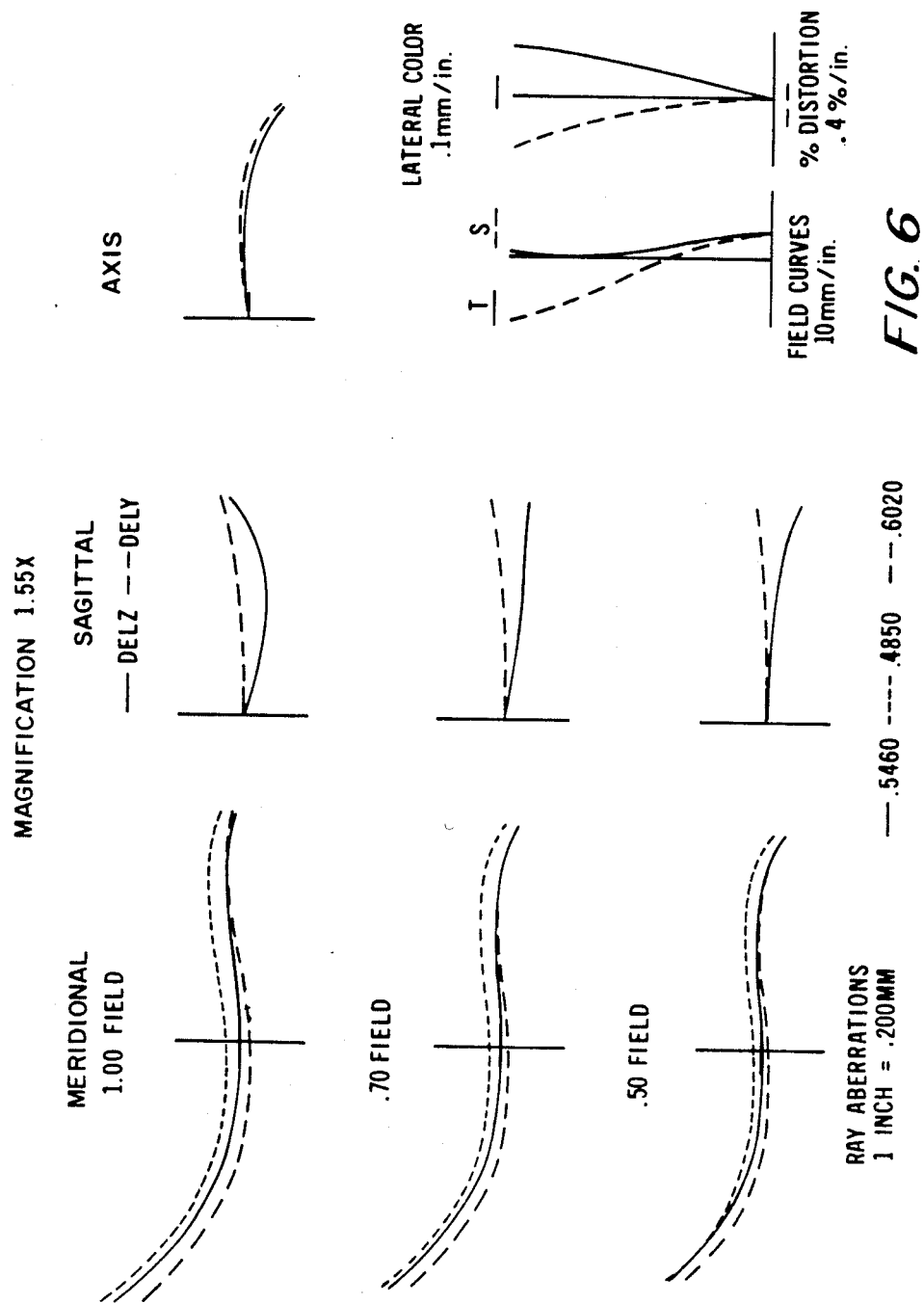
FIG. 6 is a ray aberration plot summary of the preferred embodiment for a magnification of 1.55x.

FIG. 6 is an aberration plot for a magnification of 1.55x for the example 1 lens. These also show an increase in off-axis numerical aperture caused by pupil coma.

While the invention has been described with reference to the structure disclosed, it is not confined to the details set forth, but is intended to cover such modifications or changes as may come within the scope of the following claims:

What is claimed is:

1. A wide angle photocopy lens system having a semi-field angle greater than 38°, a relative aperture of F/10, said lens system consisting of the following elements symmetrically placed around a central aperture stop:
   a. an outer positive element curved toward the aperture stop having a dioptric power greater than 0.2 and less than 0.3 of the overall dioptric power of the lens;
   b. a second negative element curved toward the aperture stop having a dioptric power greater than −1.5 and less than −1.2 of the overall dioptric power of the lens;
   c. a third positive element curved toward the aperture stop having a dioptric power greater than 1.0 and less than 1.1 of the overall dioptric power of the lens;
   d. a fourth negative element whose dioptric power is greater than −2. and less than −1.8 of the overall dioptric power of the lens; and
   e. a fifth positive element whose dioptric power is greater than 1.8 and less than 2.2 of the overall dioptric power of the lens.

2. A wide angle photocopy lens system having a semi-field angle greater than 38°, a relative aperture of F/10, said lens system consisting of the following elements symmetrically placed around a central aperture stop and having the following glass properties in sodium d light:
   a. an outer positive element curved toward the aperture stop having an index of refraction greater than 1.7 and less than 1.8 and an Abbe V number less than 40;
   b. a second negative element curved toward the aperture stop having an index of refraction greater than 1.55 and less than 1.7 and an Abbe V number less than 55;
   c. a third positive element curved toward the aperture stop having an index of refraction greater than 1.7 and an Abbe V number less than 40;
   d. a fourth negative element having an index of refraction greater than 1.7 and an Abbe V number less than 40; and
   e. a fifth positive element having an index of refraction less than 1.7 and an Abbe V number less than 50.

3. A wide angle photocopy lens system having a semi-field angle greater than 38°, a relative aperture of F/10, said lens system being partially compensated for $\cos_4$ relative illumination falloff through a magnification range of 64 to 1.55 wherein the lens consists essentially of the following design parameters:

| SURFACE | RADIUS | SPACING | REFRACTIVE INDEX $n_d$ | ABBE V NUMBER |
|---|---|---|---|---|
| 1 | 100.774602 | 6.582286 | 1.67270 | 32.17 |
| 2 | 125.402157 | .100000 | 1.00000 | |

-continued

| SURFACE | RADIUS | SPACING | REFRACTIVE INDEX $n_d$ | ABBE V NUMBER |
|---|---|---|---|---|
| 3 | 62.082748 | 5.000000 | 1.60311 | 60.69 |
| 4 | 33.350284 | 30.068850 | 1.00000 | |
| 5 | 52.117483 | 6.975000 | 1.83400 | 37.34 |
| 6 | 88.610023 | 1.077705 | 1.00000 | |
| 7 | 254.540522 | 3.035434 | 1.67270 | 32.17 |
| 8 | 46.407658 | 14.696875 | 1.60729 | 59.47 |
| 9 | .000000 | 2.000000 | 1.00000 | |

-continued

| SURFACE | RADIUS | SPACING | REFRACTIVE INDEX $n_d$ | ABBE V NUMBER |
|---|---|---|---|---|
| 10 | .000000 | 14.696875 | 1.60729 | 59.47 |
| 11 | −46.407658 | 3.035434 | 1.67270 | 32.17 |
| 12 | −254.540522 | 1.077705 | 1.00000 | |
| 13 | −88.610023 | 6.975000 | 1.83400 | 37.34 |
| 14 | −52.117483 | 30.068850 | 1.00000 | |
| 15 | −33.350284 | 5.000000 | 1.60311 | 60.69 |
| 16 | −62.082748 | .100000 | 1.00000 | |
| 17 | −125.402157 | 6.582286 | 1.67270 | 32.17 |
| 18 | −100.774602 | .000000 | 1.00000 | |

* * * * *